March 30, 1965 D. P. SANTE 3,176,240

REDUNDANT TRANSISTOR CIRCUITS

Filed Dec. 26, 1961

INVENTOR.
DANIEL P. SANTE

BY Spencer E. Olson
ATTORNEY

United States Patent Office 3,176,240

Patented Mar. 30, 1965

3,176,240

REDUNDANT TRANSISTOR CIRCUITS

Daniel P. Sante, Williamsville, N.Y., assignor to Sylvania Electric Products Inc., a corporation of Delaware Filed Dec. 26, 1961, Ser. No. 162,058
4 Claims. (Cl. 331—62)

Figure 1:
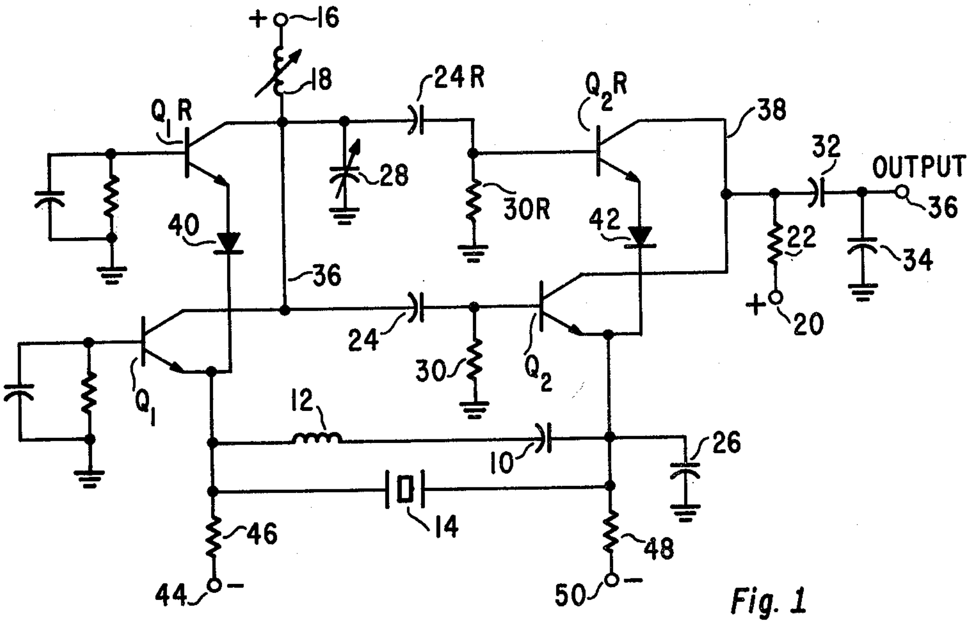

The present invention relates to circuits incorporating redundancy and is more particularly concerned with a standby form of redundancy as applied to a modified transistorized Butler oscillator circuit.

Many circuits and systems in current use frequently have a requirement for ultra-reliability; that is, it is desirable that the circuit be capable of operating for thousands of hours without failure, periods which may be longer than the mean time between failure of individual components of the circuit or system. In transistorized circuits, for example, a Butler oscillator including two transistors connected in the usual way, the failure of either of the transistors destroys the operation of the total circuit, and if the oscillator is a critical part of a larger system, the failure of a single transistor can stop the operation of the entire system. To achieve the requisite high system reliability, it is necessary to improve the reliability of individual components and circuits, a number of redundant connections having heretofore been suggested for this purpose. For example, U.S. Pat. No. 2,946,900 describes a quad transistor flip-flop to increase the mean time between failure of the flip-flop. The described technique is not universally applicable, however, since each circuit, because of its connections and intended function presents different obstacles to the convenient and inexpensive attainment of redundancy. A number of circuits, for example, lend themselves to parallel redundancy, where each circuit is paralleled with the same circuit and both normally operated all the time. In this case, failure of one of the paralleled circuits does not result in catastrophic failure since the other circuit takes over the function. In certain applications, however, it is desirable not to have the paralleled circuits operating at all times because it involves a doubling of power consumption, and may cause an undesirable amount of noise in some applications. Rather, it is often more advantageous to operate only one of the paralleled circuits, leaving the other on standby, and switching to the standby circuit, or an element of the circuit, in the event of failure of an element.

It is the primary object of this invention to provide a simple and inexpensive means for automatically switching a standby circuit or component into operation in the event of failure of the circuit or component with which it is used.

Briefly, in accordance with this invention, one set of common electrodes of corresponding transistors in the paralleled circuits, for example the emitters, are connected together through a diode. The operating voltages of the paralleled circuits under normal operation are such as to cut off the diode to thereby isolate one transistor from the other for direct current, but, upon failure of the operating transistor, to drive the diode into conduction to switch the other transistor into operation. Automatic switching from one to the other occurs for a base-to-emitter short, an open collector, or a base-emitter open, the most commonly encountered failures of transistors. The principle of operation will be described in connection with a two transistor oscillator circuit, arranged to give standby redundancy for each of the transistors, but it is to be understood that the invention is applicable to other transistorized circuitry.

Figure 2:
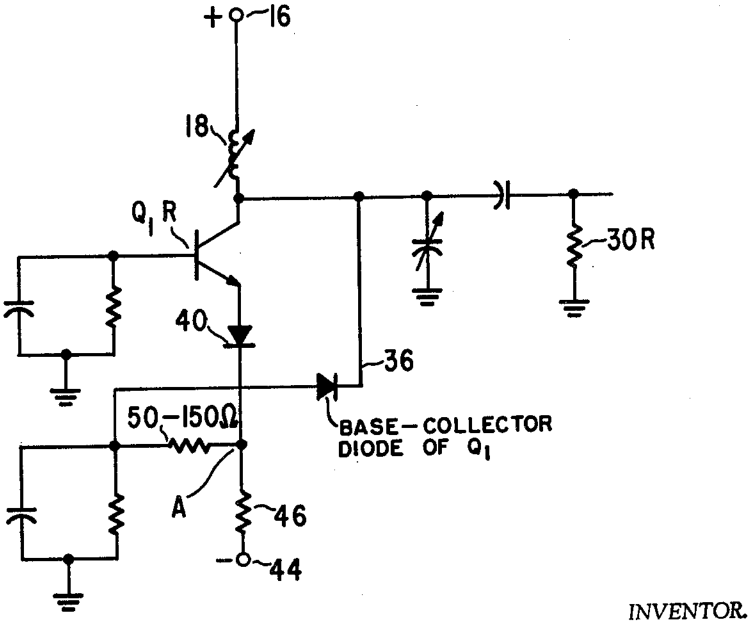

Other objects, features and advantages of the invention, and a better understanding of its organization and operation will become apparent from the following detailed description taken in conjunction with the accompanying drawings, in which:

FIG. 1 is a circuit diagram of a modified Butler oscillator circuit embodying the invention; and FIG. 2 is the equivalent circuit of a portion of the circuit of FIG. 1 upon failure of one of the transistors.

Referring to FIG. 1, the circuit in which the invention is embodied is an emitter-coupled crystal-controlled transistorized oscillator, a modified form of a Butler oscillator. Considering only the lower portion of the circuit, it includes two transistors $Q_1$ and $Q_2$, the emitters of which are coupled together by a feedback loop including a capacitor 10 and an inductance 12 connected in series and in parallel with a frequency-determining crystal 14. In addition, the emitter of transistor $Q_1$ is connected to a source of negative potential, represented by terminal 44, through resistor 46, and the collector of transistor $Q_2$ is connected to a source of negative potential, represented by terminal 50, through resistor 48. The collector of transistor $Q_1$ is connected to a source of positive potential, represented by terminal 16, through a variable inductance 18, and the collector of transistor $Q_2$ is connected to a source of positive potential, represented by terminal 20, through resistor 22. The signal appearing at the collector of transistor $Q_1$ is capacitively coupled, via capacitor 24, to the base of transistor $Q_2$. This common-emitter configuration affords a reasonably high input impedance to transistor $Q_2$ and therefore negligible loading on the driving stage. At the same time, the output impedance as seen from the emitter of transistor $Q_2$ is low and does not materially impair the "Q" of the feedback loop. Likewise, the input impedance of transistor $Q_1$ is also low. By properly adjusting inductance 18, the impedance of the collector circuit of transistor $Q_1$ can be adjusted to the proper value for the frequency determined by crystal 14 to give the necessary loop gain to sustain oscillations in transistor $Q_1$.

The circuit has the advantage of high internal loop gain and allows the output signal to be coupled from the collector of transistor $Q_2$, a point in the circuit where the output circuit will not appreciably load the oscillator. A capacitor 26 is connected between the emitter of transistor $Q_2$ and ground, its value being chosen to provide adequate feedback to excite crystal 14 within its proper fracture rating while allowing transistor $Q_2$ to also function as an amplifier between base and collector. The provision of by-pass capacitor 26 reduces degeneration in the emitter circuit of transistor $Q_2$ thereby, in effect, making available an increase in gain. The variable inductance in the collector circuit of transistor $Q_1$ is adjusted to resonate with the capacitance of capacitor 28, plus stray capacity and the capacity in parallel with the collector of the output transistor $Q_2$, near the series-resonant frequency of crystal 14. The circuit will not oscillate at the parallel-resonant frequency of the crystal since the resistance of the crystal is very high near the parallel-resonant frequency, causing its attenuation to be too great to sustain oscillations, even though the phase shift of the feedback loop is correct. At the series-resonant frequency, however, the crystal appears to be very nearly purely resistive, and energy from transistor $Q_1$ is coupled to the base of transistor $Q_2$ by capacitor 24 and resistor 30. The fundamental frequency of the oscillator is amplified by transistor $Q_2$ and coupled through a capacitive divider network including capacitors 32 and 34 to an output terminal 36. Inductance 12, which may be variable, is provided to tune out the effects of the capacity presented to the emitters of the two transistors by the crystal 14 and its associated circuitry to prevent the oscillator from free running.

Redundancy is afforded for the oscillator by providing duplicates of certain of the components, these being illustrated in the upper part of the circuit diagram with corresponding parts identified by the same reference numerals followed by the letter R. It is significant to note that only coupling capacitor 24R and resistor 30R are necessary in addition to the two active components $Q_1R$ and $Q_2R$. This is achieved by directly connecting the collectors of corresponding transistors together via connections 36 and 38. The emitters of corresponding transistors are connected together through diodes 40 and 42 which are poled in a direction to maintain transistors $Q_1R$ and $Q_2R$ in a standby condition so long as transistors $Q_1$ and $Q_2$ are operating satisfactorily. Upon failure of one or the other of transistors $Q_1$ or $Q_2$ the corresponding diode is operative to connect the redundant transistor into circuit, permitting the use of a single feedback loop regardless of which active branch is operative. The diodes isolate the operating and standby transistors for direct current, and are operative to afford redundancy for any of the following common failures of the operating transistor: base-to-emitter short, collector open or base-emitter open.

A base-to-emitter short in transistor $Q_1$, for example, which exhibits a resistance in the range of 50 to 150 ohms, results in the equivalent circuit shown in FIG. 2. Normally the potentials at the emitters of transistors $Q_1$ and $Q_2$ are maintained at a sufficiently low value as to bias diode 40 to prevent conduction between the two emitters. When a base-to-emitter short occurs, the potential at point A rises toward approximately 5 volts negative due to the voltage divider action across the emitter power supply, the negative terminal 44 of which may be at −10 volts in a typical circuit and the resistor connected between the base electrode of the transistor and a point of reference potential, indicated as ground in the present example. This negative potential is more than enough to drive diode 40 into the forward conduction region to effectively connect transistor $Q_1R$ into the circuit in place of transistor $Q_1$. In other words, with diode 40 conducting, transistor $Q_1R$ is substituted for transistor $Q_1$ which then coacts with transistor $Q_2$ to carry on the oscillator function. Extensive experimentation has shown that a short resistance of 50 ohms, the worst possible case, does not appreciably alter the output power of the oscillator.

Should an open emitter occur in transistor $Q_1$, for example, the potential at point A instantly rises toward a negative potential of 10 volts (in the present example) driving diode 40 into conduction and connecting transistor $Q_1R$ into the oscillator circuit. Then, as transistor $Q_1R$ becomes conducting, the potential at point A becomes less negative due to the voltage drop across diode 40 and the resistor 46 connected to the negative terminal 44.

An open collector circuit in transistor $Q_1$, which has been determined from defective transistors to exhibit a capacitance of the order of 2–3 picofarads, does not detune the collector tank circuit sufficiently to stop oscillations and causes only a very slight degradation of output power. With an open collector in transistor $Q_1$, the potential at point A instantly rises toward a negative 10 volts, causing diode 40 to conduct and connect transistor $Q_1R$ into the oscillator. As soon as transistor $Q_1R$ becomes conducting, the potential at point A settles to some negative value less than 10 volts due to the voltage drop in the circuit, but the diode is maintained in conduction.

Although the foregoing description has described what occurs for three kinds of failure of transistor $Q_1$, the same type of action occurs upon failure of transistor $Q_2$ to switch transistor $Q_2R$ into the circuit. Because the description already given is directly applicable to transistors $Q_2$ and $Q_2R$ it is believed that the operation of diode 42 will be readily apparent without repeating the description. Thus, the herein described standby type of redundancy in the disclosed oscillator circuit provides continued operation of the circuit for three combinations of failure:

(1) $Q_1$ fails leaving $Q_1R$ and $Q_2$ operating
(2) $Q_2$ fails leaving $Q_1$ and $Q_2R$ operating
(3) $Q_1$ and $Q_2$ fail leaving $Q_1R$ and $Q_2R$ operating.

It is therefore seen that each of transistors $Q_1$ and $Q_2$ is backed up with a standby transistor which is automatically switched into operation in the event of catastrophic failure of either or both of transistors $Q_1$ or $Q_2$. Estimates have shown that this type of redundancy will improve the mean time between failure of this type of circuit from $2.1\times10^5$ hours without redundancy to $5.4\times10^5$ hours with the described standby redundancy.

Although the invention has been described in connection with an oscillator circuit, the concept of using a diode, normally biased to be non-conducting, to connect the active and standby transistors together may be readily applied in other transistorized circuits. Accordingly, the described circuit is intended to be merely illustrative, and not to limit the scope of the invention.

What is claimed is:

1. A standby circuit arrangement comprising first and second transistors each having base, emitter and collector electrodes and each adapted to perform the same circuit function when suitably energized, a first source of potential of one polarity connected to the collectors of both of said transistors, a second source of potential of opposite polarity connected through a first resistor to the emitter of said first transistor, second and third resistors respectively connected from the base electrodes of said first and second transistors to a point of reference potential, and a diode connected between the emitters of said first and second transistors poled to conduct current in the forward direction from the emitter of said second transistor to the emitter of said first transistor, said potentials and said resistors having such relative values that said first transistor is normally operative and said diode is normally biased to prevent current flow therethrough, and on failure of said first transistor, said diode is biased into its forward conduction region thereby to connect said second source of potential to the emitter of said second transistor to cause operation of said second transistor.

2. A standby circuit arrangement comprising first and second transistors each having base, emitter and collector electrodes and each connected to perform the same circuit function when suitably individually energized, a source of positive potential connected to the collector electrodes of both of said transistors, a source of negative potential connected through a first resistor to the emitter of said first transistor, second and third resistors respectively connected from the base electrodes of said first and second transistors to a point of reference potential, and a diode connected between the emitter electrodes of said first and second transistors poled to conduct current from the emitter of said second transistor to the emitter of said first transistors, said potentials and said resistor having relative values to normally cause operation of said first transistor and to bias said diode to prevent current flow therethrough, and on failure of said first transistor, to bias said diode by the voltage divider action of said first and second resistors and the base-to-emitter resistance of said first transistor into its forward conduction region thereby to connect said source of negative potential to the emitter of said second transistor to cause operation of said second transistor in said circuit arrangement.

3. A redundant oscillator circuit including first and second transistors each having base, collector and emitter electrodes, means capacitively coupling the collector of said first transistor to the base of said second transistor, means including a first resistor connected from the base electrode of said first transistor to a point of reference potential, and a feedback path including a crystal connected between the emitters of said first and second transistors, a standby circuit arrangement comprising third and fourth transistors each having base, collector and emitter electrodes, means capacitively coupling the collector of said third transistor to the base of said fourth transistor, first and second sources of positive potential connected to the collectors of said first and third transistors and to the collectors of said second and fourth transistors, respectively, first and second sources of negative potential connected through second and third resistors, respectively, to the emitters of said first and second transistors, respectively, means including a fourth resistor connected between the base electrode of said third transistor and a point of reference potential, a first diode connected between the emitters of said first and third transistors poled to conduct current in the direction from said third to said first transistor, and a second diode connected between the emitters of said second and fourth transistors poled to conduct current in the direction from said fourth to said second transistor, said potentials and said resistors having relative values to normally cause operation of said first and second transistors and to bias said diodes to prevent current flow therethrough, and on failure of either said first or second transistor, or both, to bias its respective diode into its forward conduction region thereby to connect a respective one of said first and second sources of negative potential to the emitter of said third or fourth transistor, respectively, to cause operation of said third or fourth transistor in said oscillator circuit.

4. A standby circuit arrangement comprising first and second transistors each having base, emitter and collector electrodes and each adapted to perform the same circuit function when suitably energized, first and second resistors respectively connected from the base electrodes of said first and second transistors to a point of reference potential, a first source of potential positive with respect to said reference potential connected to the collectors of both of said transistors, a second source of potential negative with respect to said reference potential connected through a third resistor to the emitter of said first transistor, and a diode connected between the emitters of said first and second transistors poled to conduct current in the forward direction from the emitter of said second transistor to the emitter of said first transistor, said potentials and said resistors having relative values to normally suitably energize said first transistor and to bias said diode to prevent current flow therethrough in the forward direction, and upon failure of said first transistor to bias said diode into its forward conduction region to effectively connect said source of negative potential to the emitter of said second transistor and to suitably energize said second transistor.

References Cited by the Examiner

UNITED STATES PATENTS 2,946,900 7/60 Steinman ------------ 307—88.5

ROY LAKE, *Primary Examiner.*

JOHN KOMINSKI, *Examiner.*